April 9, 1929.  N. R. KRAUSE  1,708,311
COMBINATION HARVESTER THRASHER
Filed March 21, 1925
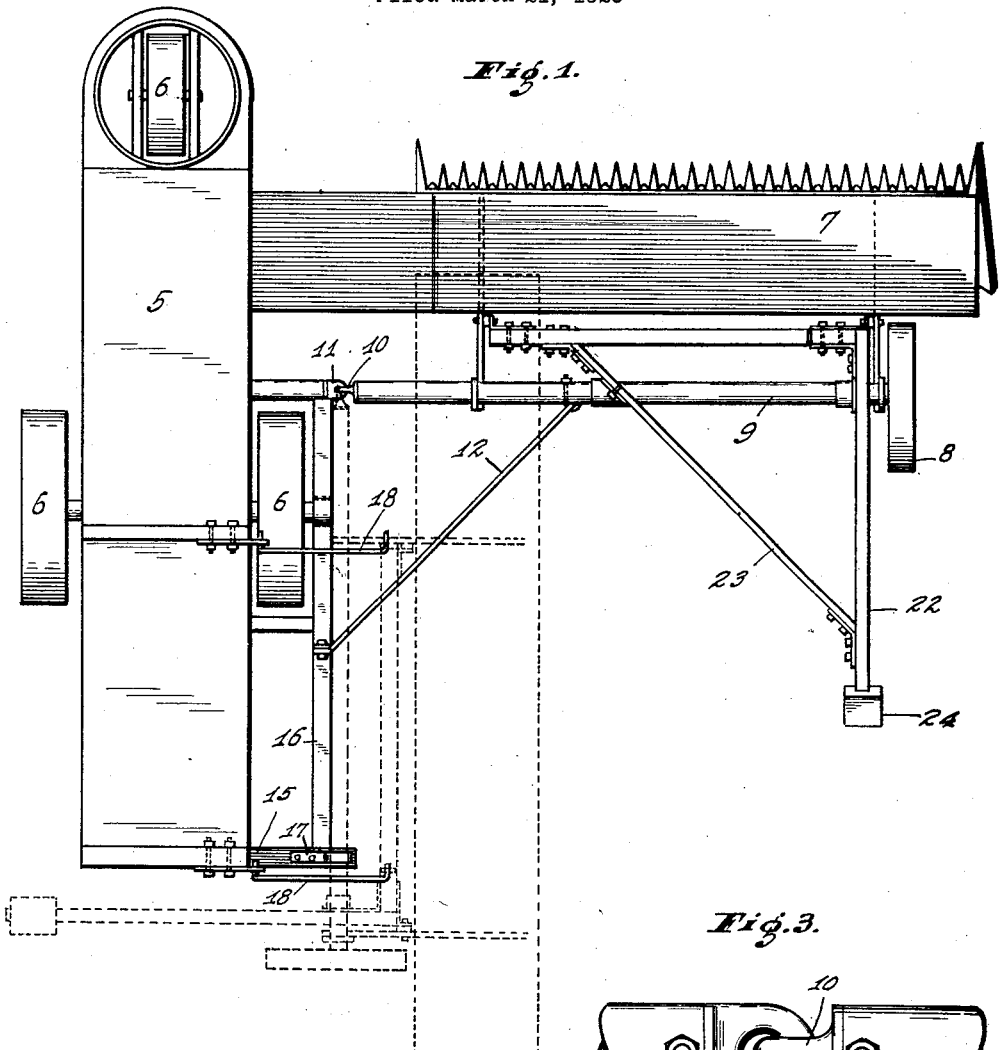
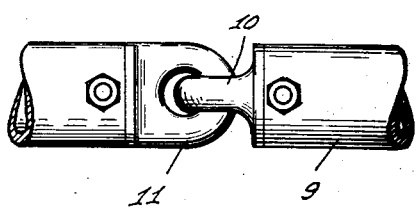
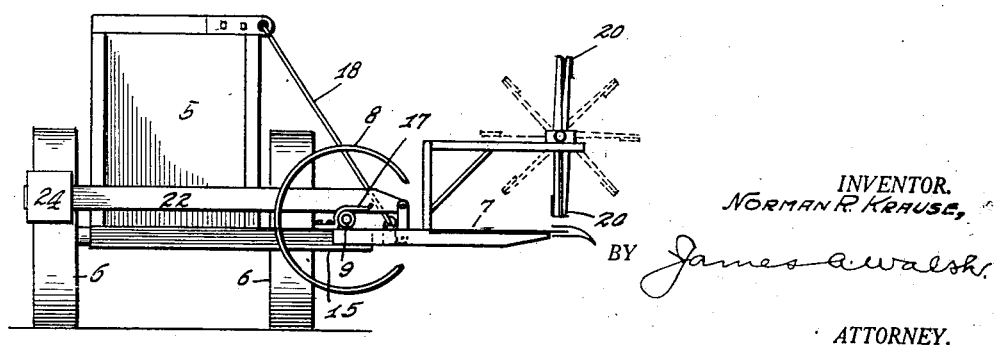
INVENTOR.
NORMAN R. KRAUSE,
BY James A. Walsh
ATTORNEY.

Patented Apr. 9, 1929.

1,708,311

UNITED STATES PATENT OFFICE.

NORMAN R. KRAUSE, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed March 21, 1925. Serial No. 17,381.

Combination harvester-thrashers, as is well known, are of an extremely wide and cumbersome character, and it is of advantage to connect said elements in a flexible manner so that the machine as a whole will follow ground irregularities without undue strain; and it is also important that the harvester be connected to the thrasher in a manner to permit the folding thereof closely alongside the thrasher to reduce the width of the entire machine whereby it may be in condition to pass through ordinary passageways such as gates and the like; and these objects I accomplish in a manner as will be hereinafter described.

In the accompanying drawing, forming part hereof, Figure 1 is a plan of a combination harvester-thrasher embodying my invention, certain parts not forming a part thereof being omitted for clearness; Fig. 2 an end elevation showing the harvester positioned upon the thrasher for transportation; and Fig. 3 a detail of the coupling which I employ.

In said drawings the portions marked 5 indicate the thrasher supported by wheels, 6, in a well known manner, and, 7, the harvester connected to the thrasher and supported by a ground-wheel, 8, mounted upon an axle, 9, or otherwise. Said axle 9 or other portion of the harvester may be flexibly connected to the thrasher by a coupling comprising a hook, 10, and eye, 11, or other suitable device, permitting the vibratory motion of the machine elements when traveling over ground irregularities, and also the adjustment of the harvester 7 alongside the thrasher 5, as indicated by dotted lines in Fig. 1, to reduce the width of the machine as a whole for transportation and other purposes. Before swinging the harvester in a horizontal direction for the purpose described it will be understood, of course, that brace 12 and similar detachable connections for flexibly securing said two elements are removed. When said harvester is swung alongside the thrasher it may be placed upon and carried by a frame member of the thrasher. For accomplishing this I provide a supporting arm, 15, projecting laterally from the thrasher and which may be connected to the longitudinal frame member, 16, the forward end of said member being secured to a portion of the thrasher, and which arm 15 constitutes a support upon which harvester 7 may be placed, as indicated in Fig. 2, the axle 9 or other portion on the harvester being held in position by a spring hook, 17, or otherwise, and the harvester further supported by links or brace-rods, 18, detachably secured to said thrasher and harvester. By employing a collapsible reel on said harvester the blades, 20, thereof may be folded to the position shown in full lines in Fig. 2 from that shown in dotted lines, and thus be substantially within the confines of the outer side of the harvester whereby, when the latter is folded as described, the minimum of space will be occupied by the combined machine for transportation purposes.

In a machine of this character I provide a counterbalancing weight on the harvester designed to balance the same in a well known manner, and to insure compactness of the machine when folded I arrange said device with its arm 22 extending rearwardly from near the outer end of the harvester, and with an inner member, 23, extending diagonally from the harvester and connected to arm 22 to brace the same, a weight, 24, being attached to said latter arm, said arm and diagonal member being disposed above said axle 9, which latter acts as a fulcrum therefor. By this arrangement, when the harvester is in folded position said counterbalancing device is brought to the rear of the thrasher in a manner not to appreciably project therefrom, it being understood, of course, that member 23 has been removed before adjusting the harvester in complete folded condition.

I claim as my invention:

1. In a machine of the class described, a thrasher, a harvester having counterbalancing mechanism, a brace connecting said counterbalancing mechanism and said harvester, flexible means connecting said harvester and thrasher whereby the harvester can be folded alongside the thrasher and its counterbalancing mechanism at the same time positioned at the rear of and in transverse relation to the thrasher, and means on the thrasher upon which the harvester is mounted and supported when in folded position.

2. In a machine of the class described, a thrasher, an axle, a harvester supported on said axle, a weighted counterbalancing arm connected to said harvester and fulcrumed on said axle, and means flexibly connecting said axle to said thrasher for folding the harvester alongside the thrasher and incidentally positioning said counterbalancing arm transversely in relation to the thrasher.

3. In a machine of the class described, a thrasher, a harvester having counterbalancing mechanism, means connecting the harvester to the thrasher for simultaneously folding the harvester alongside the thrasher and positioning the counterbalancing mechanism at the rear of and in transverse relation to the thrasher, means on the thrasher upon which the harvester is mounted when folded, and a brace connecting the thrasher and harvester for maintaining the harvester in folded position.

In testimony whereof I affix my signature.

NORMAN R. KRAUSE.